Feb. 7, 1933.  J. ROBINSON  1,896,918
AUTOMATIC TRAIN PIPE CONNECTER
Filed Oct. 8, 1929  2 Sheets-Sheet 1

INVENTOR
Joseph Robinson
BY
Watson, Coit, Morse & Grindle
ATTORNEY

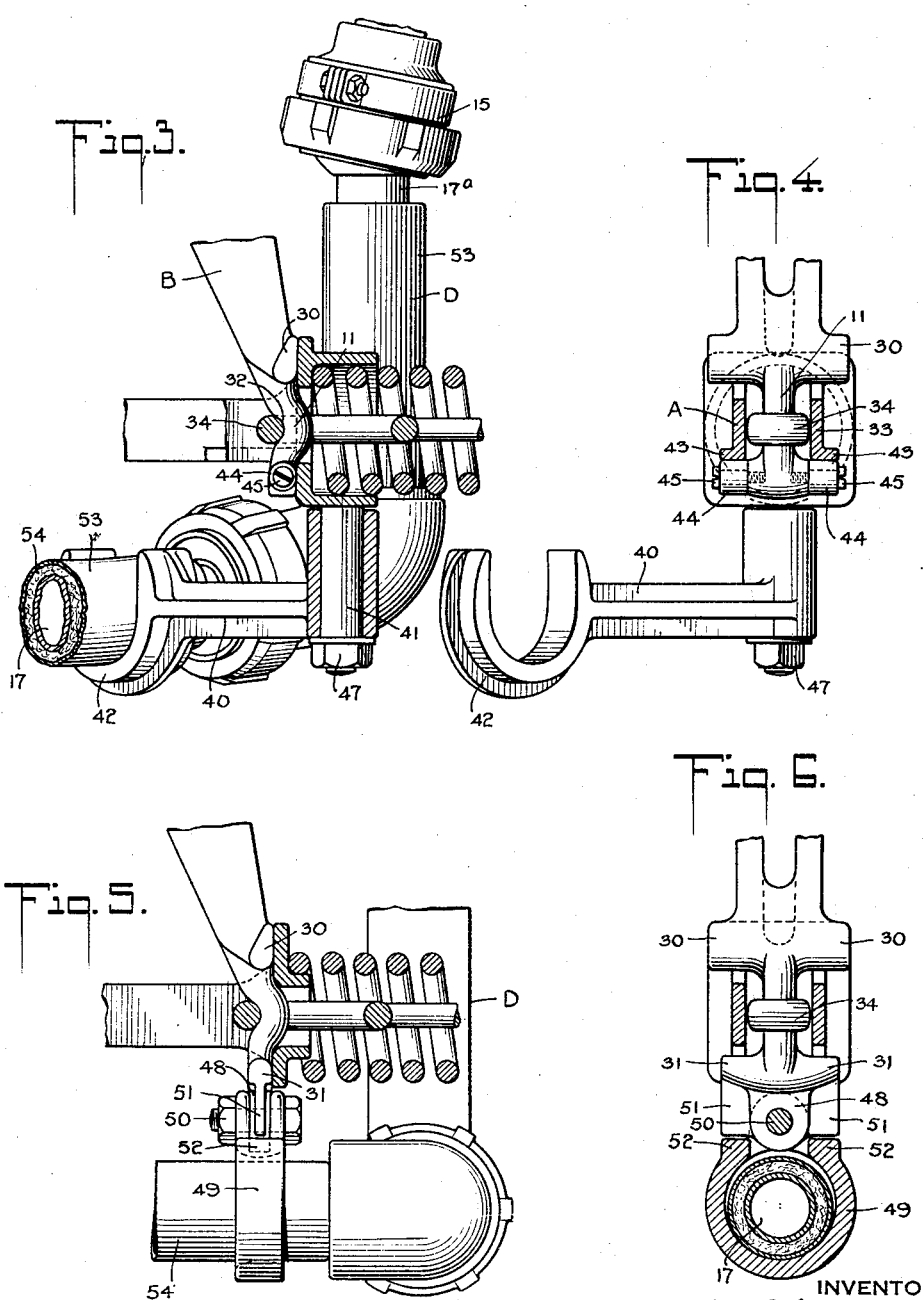

Patented Feb. 7, 1933

1,896,918

UNITED STATES PATENT OFFICE

JOSEPH ROBINSON, OF NEW YORK, N. Y.

AUTOMATIC TRAIN PIPE CONNECTER

Application filed October 8, 1929. Serial No. 398,225.

My invention relates to improvements in automatic train pipe connecters, and particularly to means in said connecters for supporting and manipulating train pipe hose of extreme weight or stiffness. During the past few years, with the length of passenger trains increased from relatively few cars to as many as 14 and 20 cars per train, it has become difficult to get steam through these long trains with sufficient pressure on the rear car to properly heat it. This is due to the size of the opening in the steam line, the number of bends and other forms of restrictions therein. In consequence it has become necessary to increase the pressure in the steam line at the head end of the train from approximately 40 pounds per square inch to 150 pounds per square inch and not infrequently to full boiler pressure of 250 pounds in order to force the steam through the train and have sufficient pressure at the rear end to heat the last car. This extreme pressure, and temperature, quickly destroys the present rubber steam hose. To meet that problem flexible metallic steam hose are being gradually introduced, and to meet the objection of frictional resistance in the steam line to the flow of steam therethrough, these metallic hose are provided with a full 2" opening.

While this arrangement has reduced the problems presented by the rubber hose, and high steam pressures, with the change have come other problems. One of these is the weight of the metallic hose, and their extreme stiffness under certain conditions. Practically the entire weight of the two coupled metallic hose is carried by the first flexible joints therein, which induces excessive wear upon those parts. By substituting an automatic connecter for the hand hose coupling now used to connect these metallic hose, important advantages and improved efficiency are secured. But the weight and stiffness of the metallic hose have been found heretofore to be a serious objection in arranging an automatic connecter which can properly handle or manipulate them.

My present invention provides such a connecter. In one embodiment of it the weight of the hose is carried by supplemental supporting mechanism, or its weight is carried by mechanically increasing the supporting resistance or capacity of the connecter buffer spring. In this embodiment of my invention the massive metallic steam hose is anchored powerfully to the bracket foundation of the connecter, which in turn is anchored to the car coupler. Thus the steam hose is caused to follow the movements of the car coupler, without any burden to the automatic connecter.

In another embodiment of my invention the hose is supported by an arm or elbow flexibly connected to the body of the connecter and supported thereby. In this embodiment of my invention the hose is both supported and carried in and to the various positions required in service by this elbow or arm. In this second embodiment of my invention anti-friction or roller bearing means is provided for the connecter body to shift on and thus reduce wear that otherwise would be imposed by the considerable weight of the metallic hose. In both this embodiment and the embodiment shown in Figures 1 and 2 the metallic steam hose passes through the connecter head at an angle, preferably approximating 45° to the track.

In still another embodiment of my invention the metallic hose is supported by and anchored to the bottom of the bracket, thus eliminating the auxiliary supporting mechanism referred to in the embodiment of my invention first hereinbefore described. In this embodiment of my invention (Figures 5 and 6) the hose does not extend through the coupling head at an angle to the track but parallel therewith.

In the drawings, Figure 1 is a side elevation of my improvement. In this view the air signal hose and the air brake hose, are omitted;

Figure 3 is a detailed view of a modification of my improvement in which the hose is supported by an arm pivotally connected to the connecter body;

Figure 4 is a front view of the construction shown in Figure 3 with the hose omitted;

Figure 1:
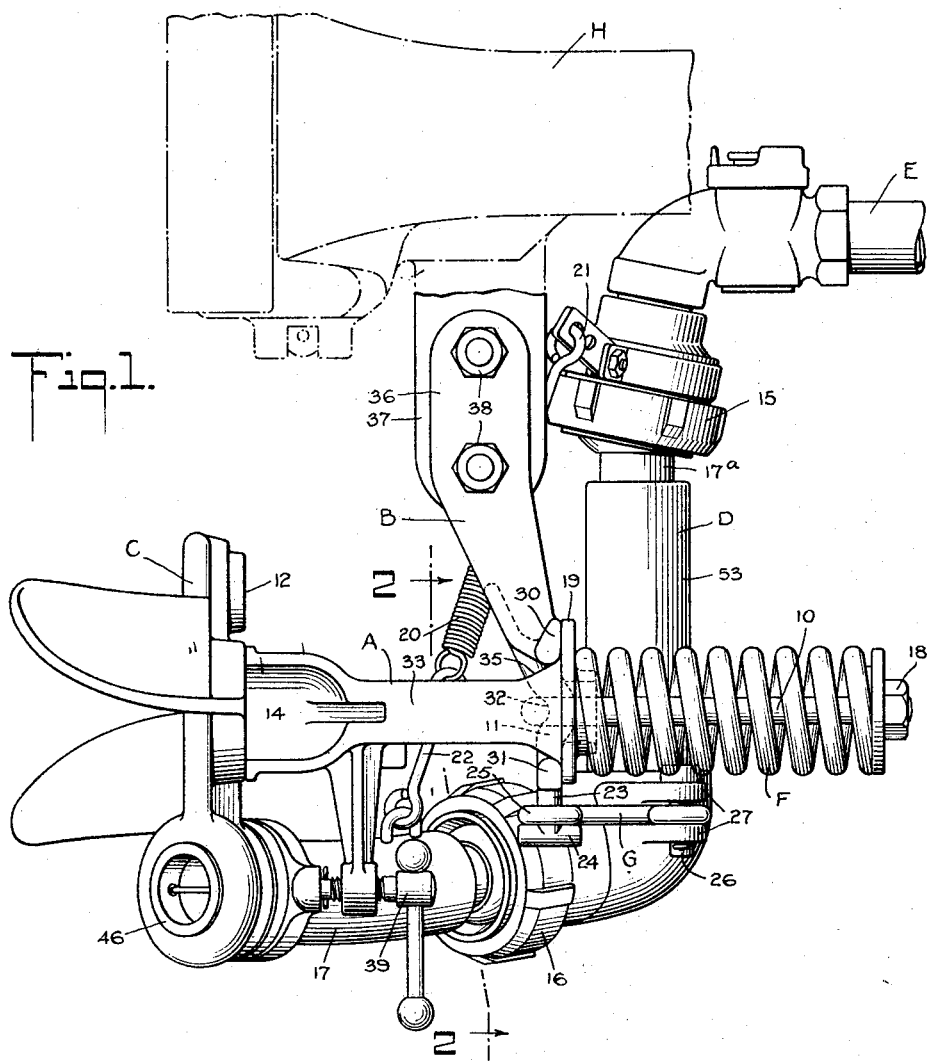

Figure 5 is a detailed view of a further modification of my invention in which the steam hose passes rearwardly from the connecter head under and to the rear of the bracket and is anchored to the lower end of the latter and supported thereby with one of its flexible joints near the fulcrum point of the connecter body, and Figure 6 is a front part sectional view of the construction shown in Figure 5.

It will be understood that my improvement is not limited to a particular type of automatic connecter supporting mechanism or coupling head. I have found advantages however in using it in connection with a connecter support of the type illustrated, in which a body A spans the bracket B and a tie rod 10 embraces or is hooked around the lower portion 11 of the bracket to yieldingly support the connecter thereon. A coupling head C of any suitable design is mounted on the forward end of the connecter body or carrier A in any suitable manner. The head is arranged to receive one or more train pipe hose. In the drawings I illustrate a passenger head in which the signal hose is connected at 12, the air brake hose at 14, and the steam hose at the bottom of the head as illustrated. The steam hose may pass through the head at an angle to the track or parallel thereto as desired. The steam hose D may be of any desired type or construction, and it may be connected to the train pipe E in any desired manner. I show a flexible metallic steam hose D having one or more flexible or universal joints 15 and 16 of conventional design. The lower or forward end 17 of the hose is mounted and removably secured in the coupling head C in the manner more clearly shown and described in my copending application Serial #381,493 filed July 27th, 1929. Of course it may be otherwise mounted in the coupling head if desired.

It will be understood that the buffer spring F, tied to the bracket B through the medium of the tie rod 10, and the adjustable abutment 18 on the tie rod, yieldingly sustains the coupling head C at the limit of its forward movement. It will also be understood that the length which the flange 19 projects vertically and engages the rear face of the bracket will determine largely the resistance which the spring presents to downward movement of the coupling head. The amount of this extension will determine the supporting resistance which the spring presents to the coupling head. A spring of sufficient resistance to support not only the automatic connecter body A and head C, but also the metallic hose D, may of course be used if desired. But when that is down the spring is usually so stiff that it interferes with the coupling of the cars. Therefore I preferably use a lighter spring and project the upper portion of the flange 19 a considerably greater distance above the center of the body A than below the center thereof, thus greatly increasing the resistance of the spring to downward movement of the coupling head. This proportion may be such as to enable the spring alone to support the connecter members and the steam hose D, but in the construction shown in Figures 1 and 2 I provide supplemental supporting means consisting of spring 20 and anchor links 21 and 22, one of which is attached to the first joint in the hose and the other of which is attached to the lower or forward portion 17 of the hose. The resistance of this supplementary supporting means is such as to entirely carry the weight of the metal hose D. By this arrangement the connecter proper is relieved of the duty of carrying the hose. However, when the cars swing to various positions of extreme lateral disalignment, the supplementary supporting means 20 will not only not cause the metal hose to follow the connecter in such movement but in some cases will offer resistance thereto. To overcome this, and particularly to overcome the inherent stiffness under such conditions of the metallic hose D, I anchor such hose to the bottom of the bracket B. This is done by providing the bracket with a vertically extending lug 23, preferably round in cross section, having a laterally extending head 24. Around this lug I hook a tie link or member G, the eye 25 of which has an oblong opening therein to pass over the cross bar 24, and this tie member I anchor at its rear end to the hose D by means of a pin 26 passing downwardly between spaced ears 27 between which is disposed eye 28 of the link G. This arrangement provides a rugged, powerful combined supporting and shifting mechanism for the metallic hose D which relieves the connecter body A, and hence the spring F and tie rod 10, of all duty and burden incident to supporting and shifting the metallic hose, and places such burden chiefly upon the car coupler H through the medium of the bracket B.

Figure 2:
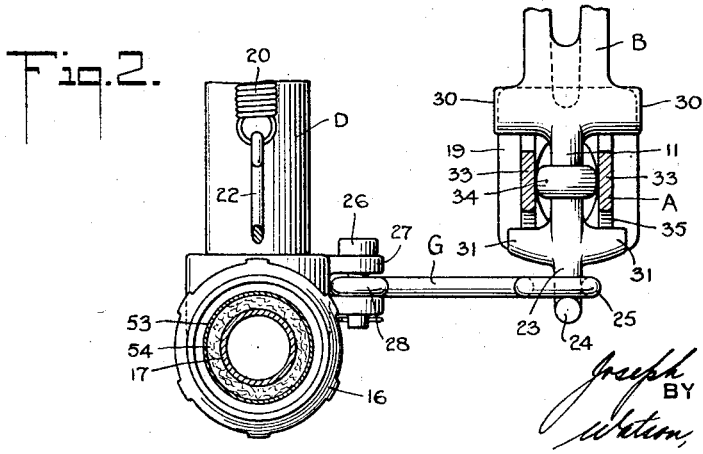
Figure 2 is a front sectional view on approximately the line 2—2 of Figure 1 showing the anchor mechanism between the bracket and the metallic steam hose D.

As shown particularly in Figures 1 and 3 the bracket is provided at its lower portion with laterally extending shoulders or projections 30 and 31 which are centrally connected by the vertically disposed lug or anchor device 11 preferably round in cross section. This anchor device is offset rearwardly, or otherwise formed, to provide a seat 32 on its front face in which seat the aforesaid tie rod is mounted for rocking movement. The spaced bars or straps 33 of the carrier A span this seat and the lug 11 and the head 34 of the tie rod 10 which is hooked around the anchor device and mounted in the seat as aforesaid. The straps are provided with inclined portions 35 which engage the laterally extending lugs 30 and 31 to position the body A on the bracket. It will be understood that this positioning of the body, and the contact of the flange 19 with the rear face of the bracket, causes the coupling head C, and hence the forward end 17 of the hose D, to return to its normal position when shifted therefrom. The projection 23 may be considered a continuation of the anchor device 11, with the projections 31 interposed between the seat 32 and the seat 24 which receives the end 25 of the link G. Thus the bracket B may be said to be provided with a pair of seats for receiving a pair of tie rods. The contacting surfaces of the seats and the tie rods in each instance being flared in opposite directions at their point of engagement. The upper portion 36 of the bracket B may of course be of any suitable design. I preferably fork it to span the lug 37, which is suitably connected to the car coupler. I anchor the bracket to the lug by bolts or rivets 38.

If it is desired to interchange a car having my invention with a car not equipped therewith, the clamp or retaining device 39, Figure 1, is threaded rearwardly and the front end 17 of the hose D is moved from the coupling head C in the manner clearly described in the foresaid co-pending application. The hose is then connected to the usual dummy hand hose coupling (not shown) in the same manner that it is coupled to the coupling head C, whereupon the hand coupling is connected into the hose of the unequipped car.

In the modification shown in Figures 3 and 4, the supplementary supporting mechanism 20 is eliminated and an arm or bracket 40 is pivotally connected to vertically disposed projection 41 formed integrally with or secured to the rear end of the body or carrier A. The outer end 42 of the arm is provided with a U shaped opening which receives the hose D. The opening is U shaped to permit the hose to be lifted out of the arm to effect interchange with an unequipped car in the general manner just described. It will be noted that in this modification the supporting means for the hose D moves in unison with the body member A. Thus the coupling head C and the hose also move in unison. Inasmuch as the weight of the hose is supported near the universal joint formed by engagement of the tie rod 10 with the bracket lug 11 the supporting resistance of the buffer spring F does not have to be so great as if the weight of the hose were supported at the coupling head. There is of course in this arrangement a tendency for the considerable weight of the hose to weigh down the rear end of the body, and thus draw the forward end of the spring down against the head or eye 34 of the tie rod. To prevent this, I turn the lower edges of the straps 33 of the member A outwardly forming a foot or bearing surface 43 of considerable width. Directly under these, and supporting them, I provide rollers, or other anti-friction devices 44 pivoted by any suitable means as by pins 45 to the lower end of the bracket B. These rollers may be of any desired size and shape. Their object is to facilitate rearward movement of the member A under the weight of the hose D, and to prevent excessive wear on the contacting parts during such movement. It will be understood that the arm or bracket 40 rotates around its vertical trunnion or pivot 41 to some extent when the cars couple forcing the hose D rearwardly as the spring F compresses. This movement is not much however on account of the unison of operation between the supporting bracket B, the carrier A and coupling head C. When the pipe or hose D is lifted out of the bracket 40 to effect interchange with an unequipped car, or to make repairs to the gasket 46 (Figure 1) or for other reasons, the bracket 40 is swung out of the way around its pivot. A suitable nut or other retaining means 47 is suitably connected to the pivot or trunnion 41 to secure the bracket in place.

The modification shown in Figures 5 and 6 consists in providing the lower laterally extending projections 31 of the bracket with a vertically disposed perforated web 48 to which a clamp 49 is removably anchored by means of a bolt or other suitable means 50. The clamp extends loosely around the forward portion 17 of the hose D, which portion passes through the head on an axis parallel with the longitudinal direction of the connecter instead of at an angle as in the case of the constructions shown in Figures 1 and 3. In this arrangement the joint 16 of the hose, is preferably disposed near the plane in which lies the fulcrum point of the body A on the bracket B, thus requiring the minimum of movement of the joint 16 to accommodate the positions of service.

To prevent the clamp 49 swinging laterally under the load of the hose D, when the car couplers shift in their carrier irons, as in rounding curves, I provide the lower end of the bracket with vertically disposed webs 51 which engage laterally extending shoulders 52 on the clamp, see especially Figure 6. It will be understood of course that the opening through the clamp 49 is sufficiently greater in diameter than the diameter of the pipe 17 as to permit the same to move in the clamp to accommodate itself to the various positions which the connecter assumes in service.

It would appear in Figure 3 as if two pipes, one within the other, are carried by the bracket 40. This is not the case. The inner members 17 and 17$^a$ are the steam conducting pipes, whilst the outer members 53 are a shell adapted to secure a covering 54 of asbestos around the pipes 17 and 17$^a$ to prevent the loss of heat through radiation, and to render the hose more convenient to handle when making gasket renewals, or interchanging with an unequipped car.

It will be understood of course that the flange 19 and the projections 30 and 31 may be so proportioned and arranged as to increase the resistance of the buffer spring F sufficiently to in itself dependably support the coupling head A and the hose D, and position the same, without the use of either of the supplemental supports 20, G, 40 or 49 herein described. For instance if the flange is widened laterally and the projections 30 and 31 are increased in length proportionately, the buffer spring will exert a sufficient lateral pull on the hose D, when the coupling head is disconnected on a curve, as to pull the hose over to normal position. Likewise with respect to the vertical dimension of the flange 19. Or if desired more than one buffer spring F may be used. It will be understood of course that the auxiliary supports herein described for the steam hose D remove from the connection between the coupling head C and the forward end 17 of the hose, many of the strains of service.

The right is reserved to file a divisional application hereof covering such constructions herein disclosed as are not specifically claimed in this application.

What I claim is:

1. An automatic train pipe connecter comprising in combination, a coupling head, a train pipe hose attached to the head, said hose being comparatively stiff, a bracket for supporting the head from the car, means including a spring for yieldingly holding the head in front of the bracket and means movably associated with the bracket and connected to said hose rearwardly of its point of attachment to said head for shifting the hose to the various positions required in service, without overburdening said spring.

2. An automatic train pipe connecter comprising in combination, a bracket secured to the coupler of the car, a coupling head, a metallic train pipe hose connected to said head, a member connecting the head and the bracket, and resilient means for yieldingly sustaining the coupling head, and a device pivotally connected at one end to said bracket and having the other end thereof engaging said hose rearwardly of its point of attachment to the head.

3. An automatic train pipe connecter comprising in combination, a bracket secured to the car coupler of the car, a relatively stiff relatively heavy train pipe hose adjacent the bracket, a link connecting the hose and the bracket whereby the hose is caused to move with the bracket, a coupling head to which the hose is secured, and means for yieldingly sustaining the coupling head with respect to the bracket, said means including a universal joint on the bracket.

4. An automatic train pipe connecter comprising in combination, a coupling head, a bracket, a member extending rearwardly from the head and spanning the bracket, a spring at the rear of the bracket adjacent said member to yieldingly sustain the head, a train pipe hose connected to the head, and means connecting the bracket and the hose to relieve said spring of the strain of flexing said hose to adjust it to the various positions required in service, said means being connected to the hose rearwardly of its point of connection with the head.

5. An automatic train pipe connecter comprising in combination, a coupling head, a hose connected thereto, a member extending rearwardly from the head, a bracket having supporting relation to the member and the head, and a device extending laterally of the bracket and the member to support and shift said hose to accommodate the hose to the various positions assumed in service by the coupling head.

6. An automatic train pipe connecter comprising in combination, a coupling head, a hose connected thereto, a bracket for supporting the head from the car coupler, and a pair of tie members pivotally supported with respect to the bracket, one of said tie members being surrounded by a spring which serves to yieldingly sustain the coupling head, and the other of the tie members being connected with said hose to support and shift the hose in service.

7. An automatic train pipe connecter comprising in combination, a coupling head, a train pipe hose connected thereto, a bracket, and a plurality of separately formed vertically spaced members pivotally mounted with respect to the bracket and carried by the bracket for yieldingly supporting said hose and said head.

8. An automatic train pipe connecter comprising in combination, a coupling head, a bracket, a member extending rearwardly from the head and spanning the bracket, a tie rod embracing the bracket adjacent the point spanned by said member, a spring surrounding the tie rod and pressing the member against the rear face of the bracket to yieldingly sustain the coupling head, a lug on the bracket below said member, a train pipe hose connected to said coupling head, and a device flexibly supported on said lug and connected to said hose whereby the strains of shifting the hose in service is removed from said coupling head.

9. An automatic train pipe connecter comprising in combination, a coupling head, a train pipe hose extending into the head at an angle to the longitudinal direction of the connecter, a bracket for supporting the head, and means extending laterally away from the bracket into engagement with said hose to free said head of the strain of shifting said hose to positions required in service, said hose being detachably secured to said means.

10. An automatic train pipe connecter comprising in combination, a coupling head, a hose, means for securing the front end of the hose to the head, a bracket for supporting the head, and means connecting the hose at a point intermediate its length to the bracket whereby said securing means is relieved of strains when said head moves in service.

11. An automatic train pipe connecter comprising, in combination, a coupling head, a hose connected at its front end to said head, a bracket, a head supporting body yieldingly supported thereon, and a member pivotally connected at one end to one of said last named parts and having its other end engaging said hose at a point rearwardly of the head.

12. An automatic train pipe connecter comprising, in combination, a coupling head, a hose connected at its front end to said head, a bracket, a head supporting body yieldingly mounted on said bracket, and a member pivotally connected at one end to said bracket and having its other end engaging said hose at a point rearwardly of the head.

13. An automatic train pipe connecter comprising, in combination, a car coupler, a bracket extending downwardly therefrom, a coupling head, a head supporting body connected to said head and yieldingly supported on said bracket, a flexible train pipe hose extending downwardly adjacent said bracket and forwardly thereof and having its front end attached to said head, a link having one end thereof pivotally associated with said bracket and the other end pivotally engaging said hose rearwardly of its point of attachment to said head.

14. An automatic train pipe connecter comprising, in combination, a bracket, a coupling head, a body connected to said said head and yieldingly supported on said bracket, a flexible train pipe hose consisting of two sections, one of said sections being arranged substantially vertically adjacent said bracket and the other substantially horizontally below said head supporting body, a member pivotally associated at one end with said bracket and having its other end engaging one of the sections of said hose rearwardly of said head.

15. An automatic train pipe connecter comprising, in combination, a bracket, a coupling head, a head supporting body connected to said head and yieldingly supporting the same on said bracket, a metallic train pipe hose comprising a front section connected to said head and a rear section connected to said front section, a link pivotally associated at its ends with said bracket and with said rear section of said hose.

16. A construction as specified in claim 15 in which said front section of the hose is detachably connected to said head and means for yieldingly supporting said section when the same is detached from the head.

17. An automatic train pipe connecter for a railway car comprising, in combination, a downwardly extending bracket supported from said car, an automatic coupling head, a body connected to said head and supported by said bracket, a flexible hose carried by said car and having a part arranged in proximity to the lower end of said bracket, and a member pivotally connected to said bracket and engaging said hose for supporting the same.

18. An automatic train pipe connecter for a railway car comprising, in combination, a downwardly extending bracket supported from said car, an automatic coupling head, a body connected to said head and supported by said bracket, a flexible conduit carried by said car and connected to said head, said conduit having a part arranged in proximity to the lower end of said bracket, a member connected to the lower end of said bracket and engaging said conduit rearwardly of its front end for supporting the same.

19. An automatic train pipe connecter for a railway car comprising, in combination, a downwardly extending bracket supported from said car, an automatic coupling head, a body connected to said head and supported by said bracket, a flexible conduit carried by said car and connected to said head, said conduit having a part arranged in proximity to the lower end of said bracket, and a member pivotally connected to the lower part of said bracket and engaging said conduit at a point rearwardly of the front end thereof.

20. An automatic train pipe connecter for a railway car comprising, in combination, a downwardly extending bracket supported from said car, an automatic coupling head, a body connected to said head and supported by said bracket, a flexible conduit carried by said car and having a part arranged in proximity to the lower end of said bracket, and a member pivotally connected to said head supporting body and engaging said conduit for supporting the same.

In testimony whereof I hereunto affix my signature.

JOSEPH ROBINSON.